US011249929B2

(12) United States Patent
Tsuji et al.

(10) Patent No.: US 11,249,929 B2
(45) Date of Patent: Feb. 15, 2022

(54) EVALUATION INDEX BASED DEVICE ALLOCATION METHOD, SYSTEM, AND PROGRAM

(71) Applicant: Nippon Telegraph and Telephone Corporation, Tokyo (JP)

(72) Inventors: Masahiko Tsuji, Musashino (JP); Shinichiro Eitoku, Musashino (JP); Yukihisa Katayama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/980,676

(22) PCT Filed: Mar. 7, 2019

(86) PCT No.: PCT/JP2019/009144
§ 371 (c)(1),
(2) Date: Sep. 14, 2020

(87) PCT Pub. No.: WO2019/176739
PCT Pub. Date: Sep. 19, 2019

(65) Prior Publication Data
US 2021/0026791 A1     Jan. 28, 2021

(30) Foreign Application Priority Data

Mar. 15, 2018 (JP) .............................. JP2018-047877

(51) Int. Cl.
*G06F 13/38* (2006.01)
(52) U.S. Cl.
CPC .......... *G06F 13/38* (2013.01); *G06F 2213/40* (2013.01)

(58) Field of Classification Search
CPC ...... G06F 9/4411; G06F 13/38; G06F 9/4413; G06F 9/4415; G06F 11/3041; G06F 11/3027; G06F 13/14; G06F 2213/40
See application file for complete search history.

(56) References Cited

U.S. PATENT DOCUMENTS

2005/0144594 A1    6/2005  Yamazaki
2007/0276992 A1   11/2007  Chew
(Continued)

FOREIGN PATENT DOCUMENTS

| JP | 2005-197826 | 7/2005 |
| JP | 2011-221634 | 11/2011 |
| JP | 2014-78083  | 5/2014 |

OTHER PUBLICATIONS

[No Author Listed], "Robotic Interaction Service Framework (RoIS)," Object Management Group®, Aug. 2016, 1(1): 131 pages.

*Primary Examiner* — Raymond N Phan
(74) *Attorney, Agent, or Firm* — Fish & Richardson P.C.

(57) ABSTRACT

A logical device for implementing a service can be dynamically assigned to an available real device. A real device assignment request relating to a registered service program is transmitted to a real device assignment determination section (112) under the control of a registration management section (1111) of a service program management section (111). An assignment of a logic device relating to the service program to a real device is determined based on logic device information, real device interface assignment information, and real device information relating to an available real device under the control of the real device assignment determination section (112). Based on the assignment information, communication processing of a control command and data between the logic device relating to the service program and the real device to which the logic device is assigned.

11 Claims, 16 Drawing Sheets

(56) References Cited

U.S. PATENT DOCUMENTS

| | | | |
|---|---|---|---|
| 2010/0306416 A1* | 12/2010 | Watkins | G06F 9/5011 |
| | | | 710/5 |
| 2013/0094452 A1 | 4/2013 | Pavlovski | |
| 2014/0359614 A1* | 12/2014 | Spracklen | G06F 9/45558 |
| | | | 718/1 |
| 2016/0012003 A1* | 1/2016 | Chawla | G06F 13/4221 |
| | | | 710/308 |
| 2017/0351443 A1 | 12/2017 | Candelaria et al. | |
| 2018/0089112 A1* | 3/2018 | Ding | G06F 13/4295 |
| 2018/0276148 A1* | 9/2018 | Ding | G06F 13/102 |

* cited by examiner

| LOGIC DEVICE NAME | LOGIC DEVICE IF LIST |
|---|---|
| Humanoid Robot | HumanoidMotion/ScenarioTalk/FaceTrack/FaceDetect/DistanceSensor/... |
| Room Light | ON/OFF/ChangeColor/... |

Fig. 4

| REAL DEVICE NAME | LOGIC DEVICE IF LIST | REAL DEVICE CONNECTION FLAG |
|---|---|---|
| HumanoidRobot0001 | HumanoidRobot.FaceTracking/HumanoidRobot.FaceDetect/··· | TRUE |
| HumanoidRobot0002 | HumanoidRobot.FaceTracking/HumanoidRobot.FaceDetect/··· | TRUE |
| SmartCamera0001 | SmartCamera.ScanFace/··· | TRUE |
| SmartCamera0002 | SmartCamera.ScanFace/··· | FALSE |

Fig. 5

| LOGIC DEVICE IF | REAL DEVICE IF | EXTERNAL SYSTEM CONNECTION SCRIPT |
|---|---|---|
| FaceTrack | HumanoidRobot.FaceTracking | - |
| FaceTrack | SmartCamera.ScanFace | - |
| FaceDetect | SmartCamera.ScanFace | SmartCamereaScript0001 |
| FaceDetect | HumanoidRobot.FaceDetect | - |
| DistanceDetect | DistanceSensor.Detect | - |

Fig. 6

| SERVICE PROGRAM | LOGIC DEVICE NAME | LOGIC DEVICE IF | REAL DEVICE NAME |
|---|---|---|---|
| Program0001 | Humanoid Robot | FaceTrack | HumanoidRobot0001 |
| Program0001 | Humanoid Robot | FaceDetect | SmartCamera0001 |
| | | | |

| VENN DIAGRAM | PATTERN 1 | PATTERN 2 |
|---|---|---|
| DESCRIPTION | LOGIC DEVICE L1 IS CONSTITUTED BY REAL DEVICE R1 | LOGIC DEVICE L1 IS CONSTITUTED BY REAL DEVICES R1 AND R2 |
| VALUE OF $A_{\{l1\}}$ WHEN ALL b IS ONE | 1 | 1/2 |

| | PATTERN 1 | PATTERN 2 |
|---|---|---|
| VENN DIAGRAM | REAL DEVICE R1, LOGIC DEVICE L1 | REAL DEVICE R1, LOGIC DEVICE L1, REAL DEVICE R2 |
| DESCRIPTION | LOGIC DEVICE L1 IS CONSTITUTED BY REAL DEVICE R1 | LOGIC DEVICE L1 IS CONSTITUTED BY REAL DEVICES R1 AND R2, AND HAS LOGIC DEVICE IF OVERLAPPING REAL DEVICES R1 AND R2 |
| VALUE OF $A_{\{21\}}$ WHEN ALL b IS ONE | 1 | $1-(3/9)=2/3$ |

Fig. 15

| | PATTERN 1 | PATTERN 2 |
|---|---|---|
| VENN DIAGRAM | REAL DEVICE R1 / LOGIC DEVICE L1 / REAL DEVICE R2 / LOGIC DEVICE L2 | REAL DEVICE R1 / LOGIC DEVICE L1 / REAL DEVICE R3 / REAL DEVICE R2 / LOGIC DEVICE L2 |
| DESCRIPTION | • LOGIC DEVICE L1 IS CONSTITUTED BY REAL DEVICE R1, AND LOGIC DEVICE L2 IS CONSTITUTED BY REAL DEVICE R2<br>• LOGIC DEVICES L1 AND L2 ARE OCCUPIED BY REAL DEVICES R1 AND R2, RESPECTIVELY | • LOGIC DEVICE L1 IS CONSTITUTED BY REAL DEVICES R1, R2 OR THE REAL DEVICES R1, R3, AND THE LOGIC DEVICE L2 IS CONSTITUTED BY REAL DEVICE R2<br>• WHEN LOGIC DEVICE L1 IS CONSTITUTED BY REAL DEVICES R1 AND R2, BOTH LOGIC DEVICES L1 AND L2 HAVE REAL DEVICES R1 AND R2 WHEN LOGIC DEVICE L1 IS CONSTITUTED BY REAL DEVICES R1 AND R3, LOGIC DEVICES L1 AND L2 DO NOT HAVE OVERLAPPED ELEMENTS IN REAL DEVICE |
| VALUE OF $A_{\{22\}}$ WHEN ALL b IS ONE — LOGIC DEVICE L1 | 1 | WHEN LOGIC DEVICE L1 IS CONSTITUTED BY REAL DEVICES R1 AND R3:1<br>WHEN LOGIC DEVICE L1 IS CONSTITUTED BY REAL DEVICES R1 AND R2: 1-3/16-{0/(16)}=13/16 |
| VALUE OF $A_{\{22\}}$ WHEN ALL b IS ONE — LOGIC DEVICE L2 | 1 | WHEN LOGIC DEVICE L1 IS CONSTITUTED BY REAL DEVICES R1 AND R3:1<br>WHEN LOGIC DEVICE L1 IS CONSTITUTED BY REAL DEVICES R1 AND R2: 1-3/16-{0/(16)}=13/16 |

Fig. 16

EVALUATION INDEX BASED DEVICE ALLOCATION METHOD, SYSTEM, AND PROGRAM

CROSS-REFERENCE TO RELATED APPLICATIONS

This application is a National Stage application under 35 U.S.C. § 371 of International Application No. PCT/JP2019/009144, having an International Filing Date of Mar. 7, 2019, which claims priority to Japanese Application Serial No. 2018-047877, filed on Mar. 15, 2018. The disclosure of the prior application is considered part of the disclosure of this application, and is incorporated in its entirety into this application.

TECHNICAL FIELD

The present disclosure relates to a device assignment method, a system, and a program for assigning a logical device to a real device.

BACKGROUND ART

In recent years, a service in which a plurality of devices are coordinated has been used.

A device management platform is known as one that implements a service in which a plurality of devices are coordinated. Such a device management platform employs an architecture for fixedly mapping a device interface of a real device to a common interface for handling (for example, see Non-Patent Literature 1).

CITATION LIST

Non Patent Literature

Non-Patent Literature 1: Robotic Interaction Service Framework (RoIS) V1.1

SUMMARY OF THE INVENTION

Technical Problem

However, in the technology described in Non-Patent Literature 1, it is necessary to prepare the kinds of real devices and the number of real devices prescribed to be used in the service to implement a service in which a plurality of devices are coordinated as described above. That is, it is difficult to provide a service when the number of real devices of a certain kind is insufficient, and it is also difficult to provide a service when using a real device that is different in kind from the one previously prescribed.

The present disclosure has been made with reference to the above circumstances, and an object of the present disclosure is to provide a device assignment method, a system, and a program for dynamically assigning logical devices for implementing services to available real devices.

Means for Solving the Problem

To solve the above problem, a first aspect of the present disclosure provides a device assignment method executed by an apparatus including a hardware processor and a memory, the device assignment method includes steps of determining at least one real device to which a logical device is assigned for implementing a predetermined service; and executing a function of the logical device through communication of a control command and data between the logical device and the determined real device.

According to a second aspect of the present disclosure, the step of determining at least one real device includes determining at least one real device to which the logical device is assigned based on information indicating how each logical device interface that the logical device has corresponds to a real device interface that a real device has.

According to a third aspect of the present disclosure, the step of executing the function includes communicating with a system that converts the control command or the data to enable data communication between the logical device interface that the logical device has and the real device interface that the determined real device has.

According to a fourth aspect of the present disclosure, the step of determining at least one real device includes determining at least one real device to which the logical device is assigned further based on at least one of the following: a first evaluation index in which an evaluation value decreases, as a number of a real device to which one logical device is assigned increases from one; a second evaluation index in which an evaluation value decreases, as a degree of matching decreases between a logical device interface that one logical device has and a logical device interface corresponding to a real device interface of a real device to which the logical device is assigned; a third evaluation index in which an evaluation value decreases, as more overlapping logical device interfaces are assigned among real devices to which one logical device is assigned; and a fourth evaluation index in which an evaluation value decreases, as more overlapping logical device interfaces are assigned between a real device to which one logical device is assigned and a real device to which another logical device is assigned.

According to a fifth aspect of the present disclosure, the device assignment method further includes a step of detecting a real device, in which the step of determining at least one real device includes determining, out of the detected real device, at least one real device to which the logical device is assigned.

Effects of the Invention

According to the first aspect of the present disclosure, a logical device is dynamically assigned to an available real device. After that, the function of the logical device is executed through communication between the logical device and the real device to which the logical device is assigned, and a service is provided. In the processing of dynamically assigning a logical device to an available real device in this way, for example, it is also possible to assign the same kind of logical device to different kinds of real devices, or to assign a plurality of logical devices to one real device. Thereby, even when it is difficult to provide services in the related art, such as when the number and kinds of real devices required for providing services are insufficient in the service providing field, it is possible to provide services without adding the kind and number of real devices.

According to the second aspect of the present disclosure, a real device to which the logical device is assigned is determined based on a correspondence between a logical device interface and a real device interface. Therefore, it is possible to communicate control commands or data required when executing the function of the logical device between the logical device and the real device to which the logical device is assigned.

According to the third aspect of the present disclosure, communication is performed with a system that converts the control command or the data so as to enable data communication between the logical device interface and the real device interface. By coordinating with such a system, a combination of the logical device interface and the real device interface, which cannot normally correspond to each other, can also correspond, that is, the real device interface can be virtually expanded. Therefore, it is possible to assign a logical device to more kinds of real devices.

According to the fourth aspect of the present disclosure, a real device that becomes an assignment destination of a logical device is determined based on at least one of the four evaluation indices described above. By using these evaluation indices, for example, the criteria for the assignment processing can be determined, such as the related functions of the logical device is assigned to one real device as much as possible or the functions of one logical device is assigned to a plurality of real devices in an overlapping manner so that the real device interface can be used effectively.

According to the fifth aspect of the present disclosure, a real device to which a logical device is assigned is dynamically determined according to a detection status of an available real device each time. In this way, even when it is difficult to provide services in known technologies, such as when the number and kinds of real devices required for providing services are insufficient in the service providing field, it is possible to provide services without adding the kind and number of real devices.

That is, according to each aspect of the present disclosure, it is possible to provide a device assignment method, system, and program for dynamically assigning a logical device for implementing a service to an available real device.

BRIEF DESCRIPTION OF DRAWINGS

FIG. 4 is a diagram illustrating an example of logic device information.

FIG. 5 is a diagram illustrating an example of real device information.

FIG. 6 is a diagram illustrating an example of real device interface assignment information.

FIG. 7 is a diagram illustrating an example of real device assignment information.

FIG. 13 is a diagram schematically illustrating a first evaluation index used for calculating a real device assignment evaluation value.

FIG. 15 is a diagram schematically illustrating a third evaluation index used for calculating a real device assignment evaluation value.

FIG. 16 is a diagram schematically illustrating a fourth evaluation index used for calculating a real device assignment evaluation value.

DESCRIPTION OF EMBODIMENTS

Hereinafter, an embodiment of the present disclosure will be described in detail with reference to the drawings.

First Embodiment

Figure 1:
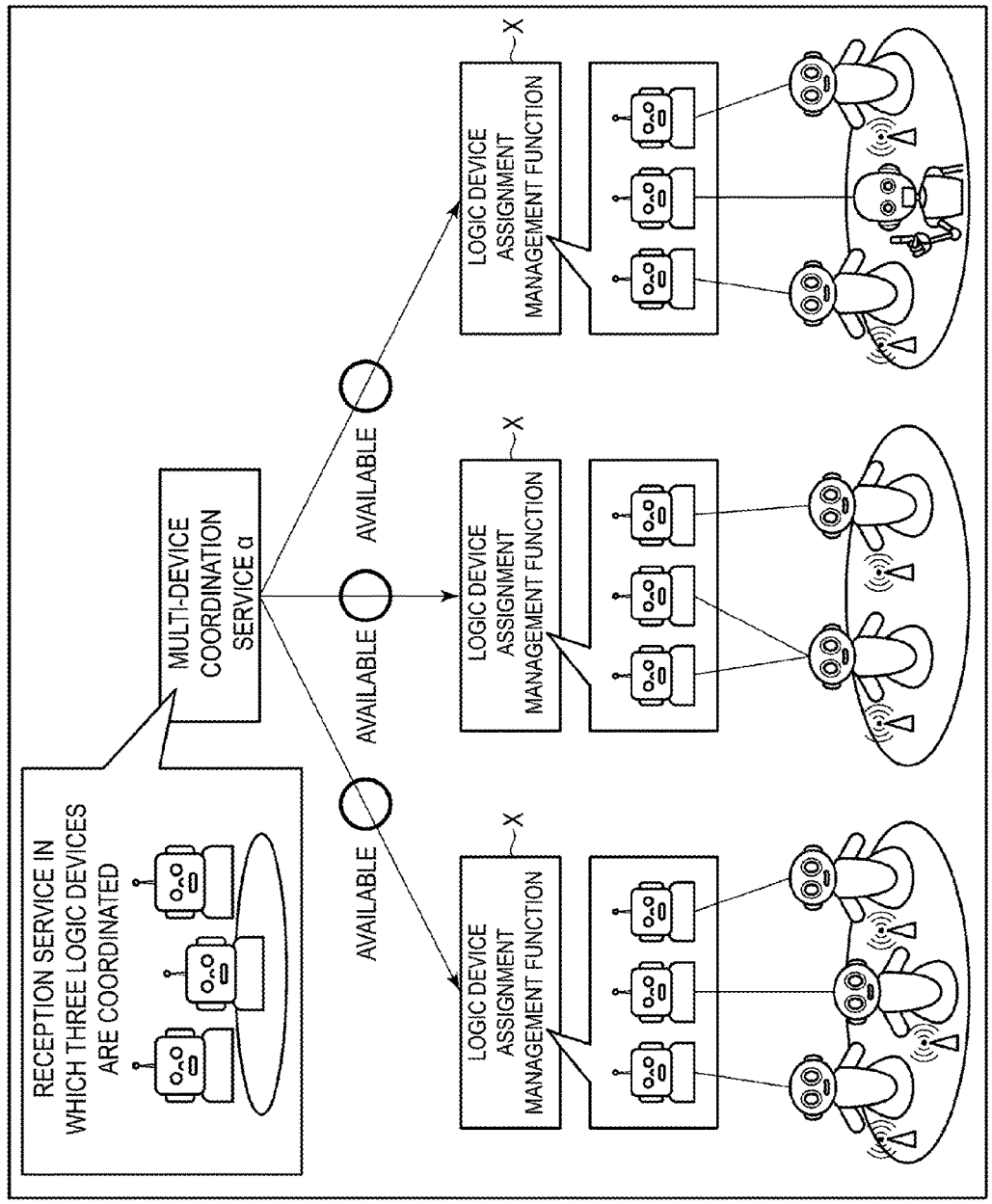
FIG. 1 is a first bird's-eye view of a first embodiment of the present disclosure.

FIG. 1 is a first bird's-eye view of a first embodiment of the present disclosure.

In the present embodiment, a real device used in a multi-device coordination service provided by controlling a plurality of devices is defined as a logical device (hereinafter, it is referred to as "logic device") configured with a set of functions provided by the device.

More specifically, a logic device assignment management function X assigns each logic device used in a service program for providing the above service to a real device, which is on a service providing field, capable of corresponding to the logic device. Note that the real device is, for example, a terminal such as a robot or a sensor.

If such a configuration can be implemented, for example, when a reception service defined as coordinating three logical devices of the same kind is provided, even when only two real devices exist on the service providing field, it is possible to provide the same service by assigning two logical devices to one real device. Further, even when different kinds of real devices exist in the service providing field, the same service can be provided by assigning the same kind of logical device to the different kinds of real devices.

Figure 2:
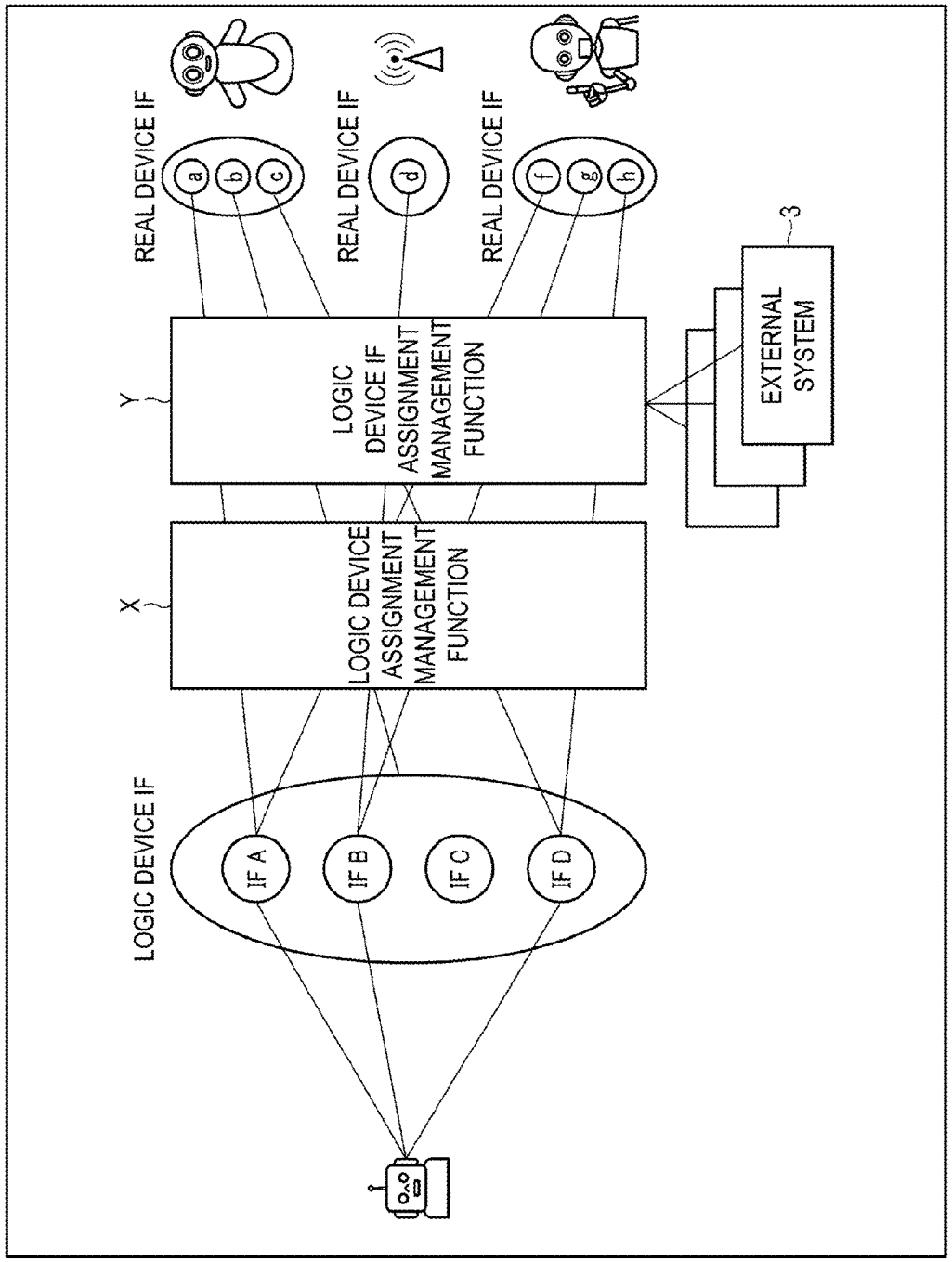
FIG. 2 is a second bird's-eye view of the first embodiment of the present disclosure.

FIG. 2 is a second bird's-eye view of a first embodiment of the present disclosure. First, focusing on a logical device interface (hereinafter, it is referred to as a "logic device interface") which is included in a logic device and receives a command for controlling the logic device from outside and transmits data to the outside of the logic device. The logic device is defined as a set of logic device interfaces A, B, and D.

Meanwhile, a real device that can be used on the service providing field has an interface (hereinafter, it is referred to as a "real device interface") that receives a command for controlling the real device from outside and transmits data to the outside of the real device. FIG. 2 illustrates a real device that provides real device interfaces a, b, and c, a real device that provides a real device interface d, and a real device that provides real device interfaces f, g, and h.

When a logic device is assigned to a real device, a correspondence that the logic device interface and the real device interface can correspond to each other is considered, and the real device that becomes an assignment destination of each of the logic device interfaces of the logic device is determined.

The logic device interface assignment management function Y maps the real device interface and the logic device interface to each other. The logic device interface assignment management function Y can extend the functionality of the real device so that the real device interface and the logic device interface can correspond with each other by coordinating with an external system 3 in a process of mapping. By using the mapping function, it is possible to determine a real device that becomes an assignment destination in units of a logic device interface, not in units of a logic device, thereby various kinds of real devices can be used as assignment destinations of logic devices as described above.

The logic device assignment management function X can also determine the real device that becomes an assignment destination in logic device interface units as the logic device and the real device are mapped N to 1, thereby even when the number of real devices is small, the real device can be used as an assignment destination of the logic device as described above.

Configuration

Figure 3:
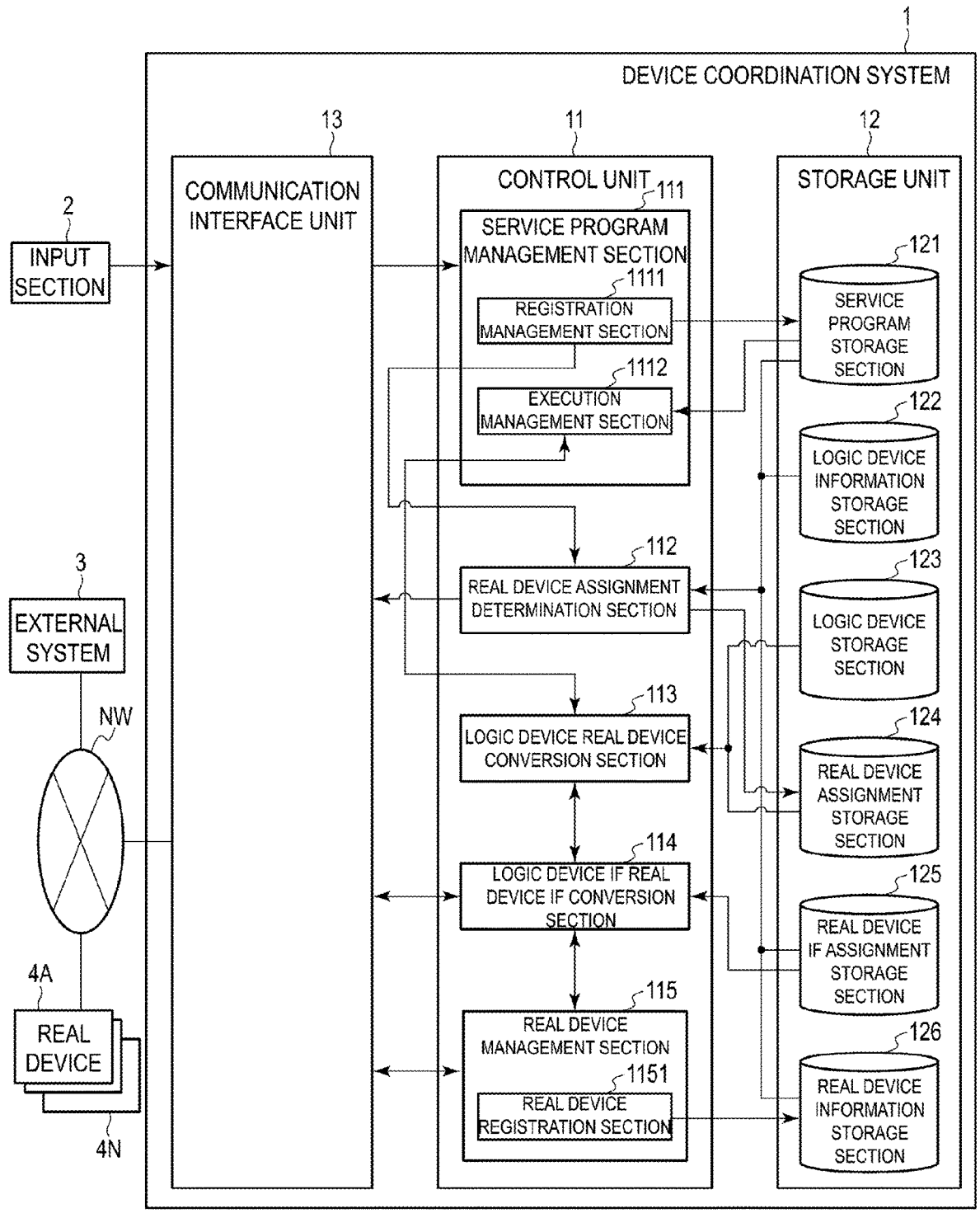
FIG. 3 is a block diagram illustrating a functional configuration of a device coordination system according to the first embodiment of the present disclosure.

FIG. 3 is a block diagram illustrating a functional configuration of a device coordination system 1 according to the first embodiment of the present disclosure. In the present embodiment, a device coordination system 1 will be described as a non-limiting example of a device assignment system. Note that the device coordination system 1 illustrated in FIG. 3 is merely an example, and the components included in the device coordination system 1 may exist as physically separate devices in any combination.

The device coordination system 1 includes a control unit 11, a storage unit 12, and a communication interface unit 13 as hardware.

The communication interface unit 13 includes, for example, one or more wired or wireless communication interface units. The communication interface unit 13 inputs, to the control unit 11, a service program input by an input section 2 including a keyboard or a mouse, for example, and an operation signal of the service program. Note that the service program is, for example, a program in which a service processing logic for receiving data (Hereafter, device transmission data) transmitted from a device or transmitting a control command with respect to the device (Hereinafter, it is referred to as "device control command") such as "when a first device transmits first data, causes a second device to perform first processing" through a device interface, is described.

Further, the communication interface unit 13 outputs data such as device transmission data and device control data output from the control unit 11 to the external system 3, and outputs data after the data conversion transmitted from the external system 3 to the control unit 11. Further, the communication interface unit 13 outputs device transmission data transmitted from real devices 4A, . . . , 4N, which are terminals such as robots and sensors, to the control unit 11, and outputs data such as a device control command output from the control unit 11 to the real devices 4A, . . . , 4N.

The storage unit 12 uses, as a storage medium, a non-volatile memory that can be written and read at any time, such as a Hard Disc Drive (HDD) or a Solid State Drive (SSD). To implement the present embodiment, the storage unit 12 includes a service program storage section 121, a logic device information storage section 122, a logic device storage section 123, a real device assignment storage section 124, a real device interface assignment storage section 125 and a real device information storage section 126.

The service program storage section 121 is used to store a service program.

The logic device information storage section 122 stores logic device information. The logic device information includes, for example, the correspondence between an available logic device and a logic device interface.

The logic device storage section 123 stores a program that constitutes a logic device, which is a set of functions for implementing a service program.

The real device assignment storage section 124 is used to store real device assignment information. The real device assignment information includes, for example, a correspondence between a logic device assigned under the control of the real device assignment determination section 112 and a real device.

The real device interface assignment storage section 125 stores real device interface assignment information. The real device interface assignment information includes, for example, the correspondence between the real device interface and the logic device interface, and a program for mutual conversion.

The real device information storage section 126 is used to store the real device information. The real device information includes, for example, the correspondence between an available real device and a real device interface.

The control unit 11 includes a hardware processor such as a central processing unit (CPU) and a program memory. To execute processing functions in the present embodiment, the control unit 11 includes a service program management section 111, a real device assignment determination section 112, a logic device real device conversion section 113, a logic device interface real device interface conversion section 114, and a real device management section 115. All of the processing functions of these units are implemented by causing the hardware processor to execute a program stored in the program memory. Note that these processing functions may be implemented not by using a program stored in the program memory, but by using a program provided through a network.

The service program management section 111 includes a registration management section 1111 and an execution management section 1112.

The registration management section 1111 executes processing for registering a service program. Specifically, the registration management section 1111 executes processing of acquiring a service program from the input section 2 through the communication interface unit 13 and storing the acquired service program in the service program storage section 121.

The execution management section 1112 executes processing of reading and executing the registered service program stored in the service program storage section 121, and receiving device transmission data from the logic device real device conversion section 113 or processing of transmitting a device control command to the logic device real device conversion section 113 via the logic device interface.

First, the real device assignment determination section 112 executes processing of determining a logic device used in the service program stored in the service program storage section 121. Note that the logic devices determined to be used in the service program may be a plurality of logic devices that are not limited to the same kind. Next, the real device assignment determination section 112 executes processing of accessing the logic device information storage section 122 to acquire information about the logic device interface of the logic device used in the service program. Meanwhile, the real device assignment determination section 112 executes processing of accessing the real device interface assignment storage section 125 and the real device information storage section 126 to acquire information about the logic device interface that can correspond to the real device interface of each available real device. After that, the real device assignment determination section 112 executes processing of determining which real device is assigned to each logic device based on the information about the logic device interface of the logic device used in the above-described service program, and the information about the logic device interface that can correspond to the real device interface of each available real device. Finally, the real device assignment determination section 112 executes processing of storing the correspondence between the logic device and the real device assigned in this way to the real device assignment storage section 124.

In the assignment determination processing, it is not necessary to perform the assignment processing in such a way that the logic device and the real device have a one-to-one correspondence. The assignment processing may be performed so that a plurality of real devices are associated with one logic device. Alternatively, the assignment processing may be performed so that one real device is associated with a plurality of logic devices.

Further, in the assignment determination processing, it is not necessary to determine only such an assignment that the logic device interface and the real device interface have a one-to-one correspondence. The assignment of the correspondence in which a plurality of real device interfaces are associated with one logic device interface may be determined. Alternatively, the assignment of the correspondence in which one real device interface is associated with a plurality of logic device interfaces may be determined.

The logic device real device conversion section 113 executes processing of receiving data such as a device control command transmitted from the execution management section 1112 of the service program management section 111, and requesting the logic device interface real device interface conversion section 114 to perform processing the received data as data addressed to the real device defined by the information stored in the real device assignment storage section 124.

Meanwhile, the logic device real device conversion section 113 executes processing of receiving the device transmission data transmitted from the logic device interface real device interface conversion section 114, and transmitting the received device transmission data to the execution management section 1112 of the service program management section 111 as data addressed to the logic device defined by the information stored in the real device assignment storage section 124.

The logic device real device conversion section 113 executes processing of accessing the logic device stored in the logic device storage section 123 to perform a program that constitutes the logic device in data such as a device control command transmitted from the execution management section 1112 or device transmission data transmitted from the logic device interface real device interface conversion section 114.

The logic device interface real device interface conversion section 114 executes processing of receiving data such as a device control command transmitted from the logic device real device conversion section 113, and device transmission data transmitted from the real device management section 115, and converting the real device interface and the logic device interface to each other by referring to the information stored in the real device interface assignment storage section 125 for the received data. Note that the logic device interface real device interface conversion section 114 also executes processing of adding processing that does not exist in the device and interpolating a communication protocol as necessary. After that, the logic device interface real device interface conversion section 114 executes processing of transmitting data obtained by converting the real device interface and the logic device interface to each other to the real device management section 115 or the logic device real device conversion section 113.

Further, the logic device interface real device interface conversion section 114 can communicate with the external system 3 through the communication interface unit 13. The external system 3 can convert the data transmitted and acquired from the logic device interface real device interface conversion section 114 so as to enable data communication between the logic device interface and the real device interface, and return the converted data to the logic device interface real device interface conversion section 114. In the conversion of the data, for example, the conversion of a data format or primary processing of data transmitted from the real device is executed.

The real device management section 115 includes a real device registration section 1151. The real device registration section 1151 executes processing of detecting an available real device, and writing the fact that the real device is available in the real device information storage section 126. Further, the real device registration section 1151 executes processing of detecting that the real device that is available becomes unavailable, and deleting the information indicating that the real device is available, which is stored in the real device information storage section 126.

Further, the real device management section 115 executes processing of receiving data such as a device control command transmitted from the logic device interface real device interface conversion section 114, and transmitting the received data to the destination real device among the real devices 4A to 4N through the communication interface unit 13. Meanwhile, the real device management section 115 executes processing of acquiring the device transmission data transmitted from the real devices 4A to 4N through the communication interface unit 13, and transmitting the acquired device transmission data to the logic device interface real device interface conversion section 114.

FIG. 4, FIG. 5, FIG. 6, and FIG. 7 illustrate a data structure of information used in the present embodiment.

FIG. 4 illustrates an example of the logic device information stored in the logic device information storage section 122.

FIG. 5 illustrates an example of the real device information stored in the real device information storage section 126.

FIG. 6 illustrates an example of the real device interface assignment information stored in the real device interface assignment storage section 125.

Among the information illustrated in FIG. 4, FIG. 5, and FIG. 6, information other than a real device connection flag in FIG. 5 is assumed to be registered in advance by an operator, for example.

FIG. 7 illustrates an example of the real device assignment information stored in the real device assignment storage section 124.

Operation

Next, the operation of the device coordination system 1 configured as described above will be described.

Operation Sequence

First, real device availability status registration processing, real device assignment determination processing, and service program execution processing executed by the control unit 11 of the device coordination system 1 illustrated in FIG. 3 will be described.

Note that the following two are premised on the above-described processing.

First, necessary data is accumulated in the logic device information storage section 122, the real device interface assignment storage section 125, and the real device information storage section 126.

Second, in the real device assignment storage section 124, data for statically assigning the real device and the logic device in advance is accumulated, or data that is dynamically assigned using the function of the real device assignment determination section 112 is accumulated.

(1) Real Device Availability Status Registration Sequence

Figure 8:
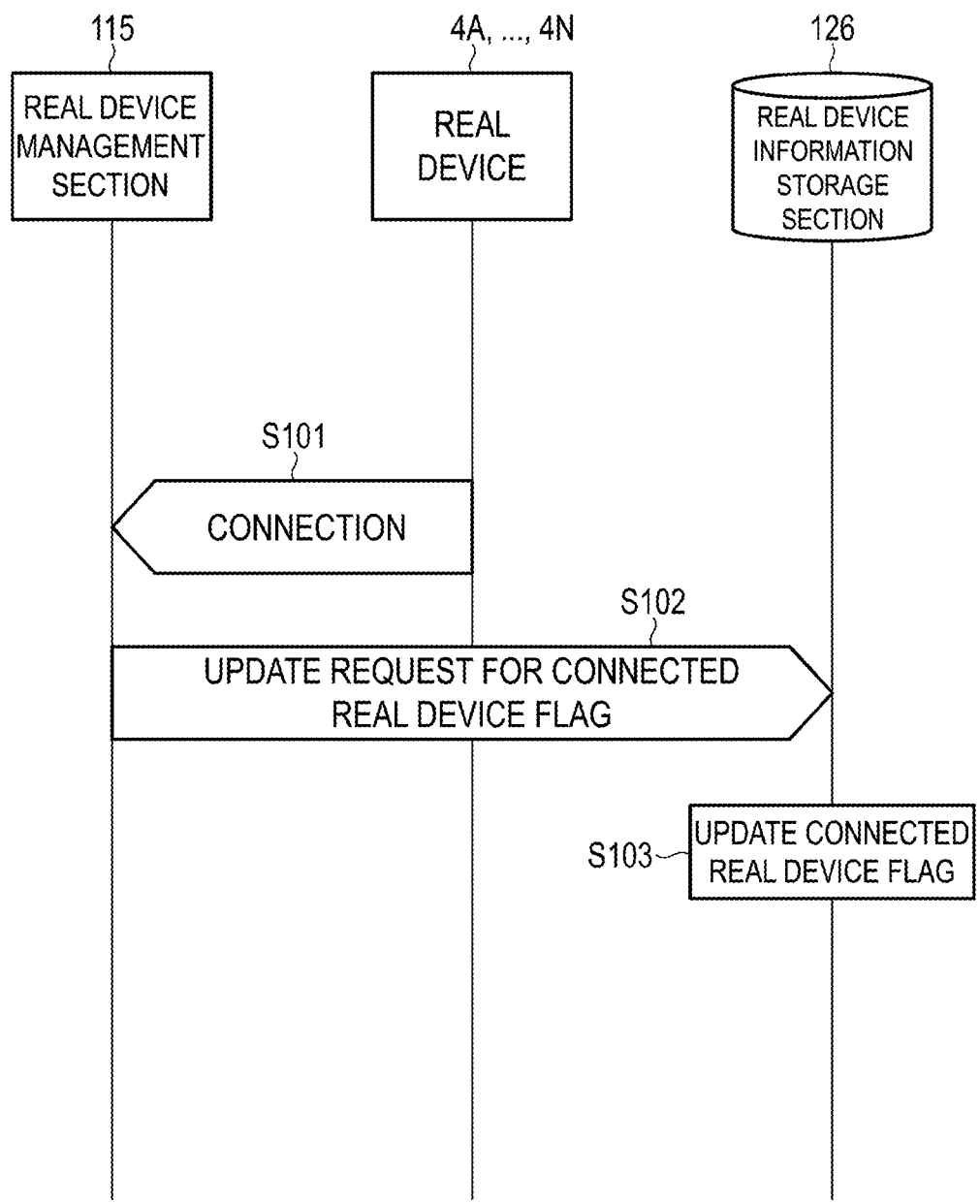
FIG. 8 is a sequence diagram illustrating an example of real device registration processing executed by a control unit illustrated in FIG. 3.

FIG. 8 is a sequence diagram illustrating an example of real device registration processing executed by a control unit 11 illustrated in FIG. 3.

In step S101, any real device among the real devices 4A to 4N is connected to the device coordination system 1, and the control unit 11 detects a real device which is connected and available, under the control of the real device registration section 1151 of the real device management section 115.

In step S102, the control unit 11 transmits, to the real device information storage section 126, an update request of a flag of the connected real device for registering the fact that the real device relating to the above-described detection is available under the control of the real device registration section 1151.

In step S103, the flag of the connected real device stored in the real device information storage section 126 is updated in response to the update request of the flag, and the fact that the real device relating to the above-described detection is available is registered.

Figure 9:
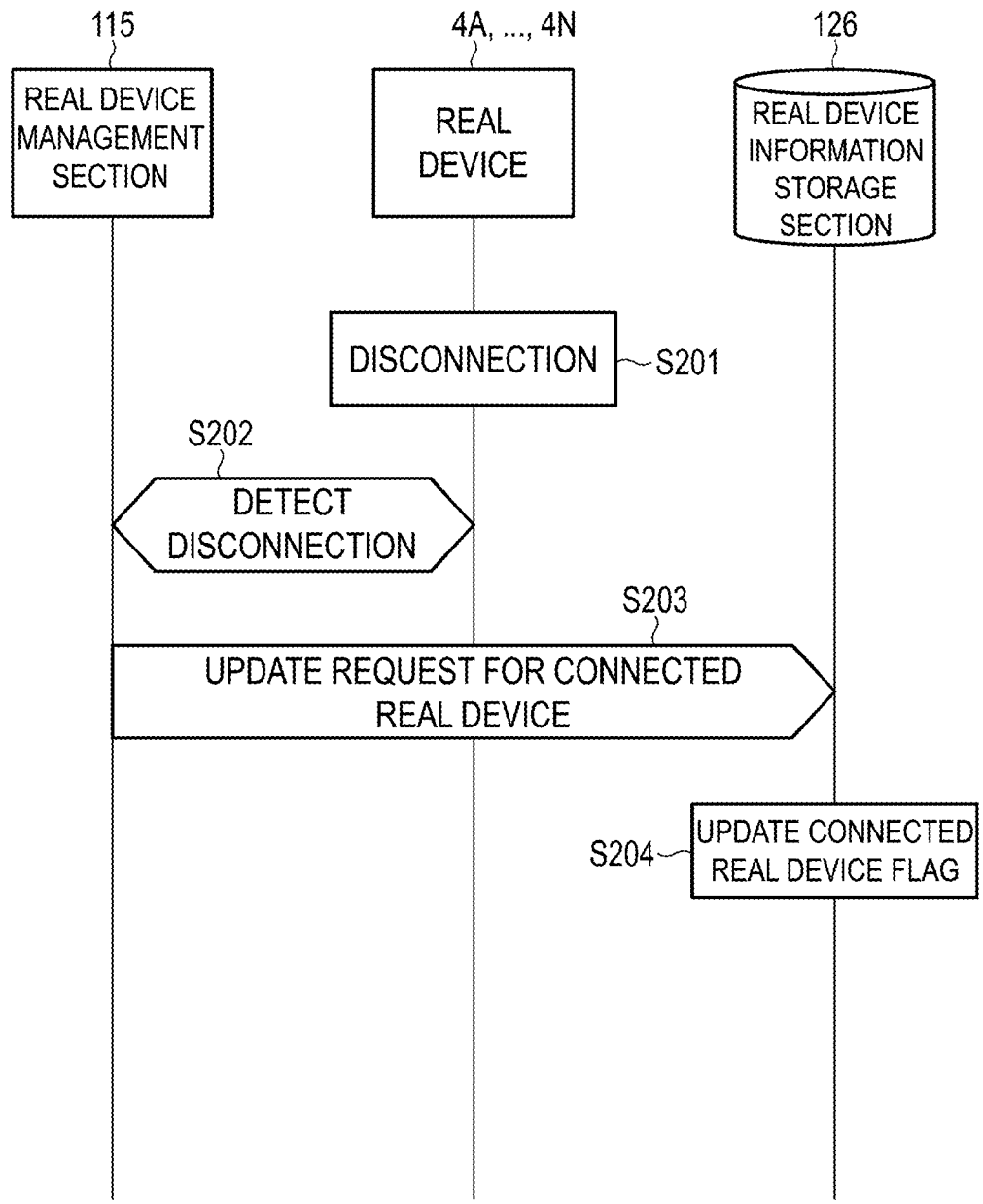
FIG. 9 is a sequence diagram illustrating an example of real device registration deletion processing executed by the control unit illustrated in FIG. 3.

FIG. 9 is a sequence diagram illustrating an example of real device registration deletion processing executed by the control unit 11 illustrated in FIG. 3.

In step S201, the connection between any real device among the real devices 4A to 4N and the device coordination system 1 is disconnected.

In step S202, the control unit 11 detects the disconnected real device under the control of the real device registration section 1151 of the real device management section 115.

In step S203, an update request of a flag of the connected real device for registering the fact that the real device relating to the above-described detection is not available, is transmitted to the real device information storage section 126 under the control of the real device registration section 1151.

In step S204, the flag of the connected real device stored in the real device information storage section 126 is updated in response to the update request of the flag, and the fact that the real device relating to the above-described detection is not available is registered.

(2) Real Device Assignment Determination Sequence

Figure 10:
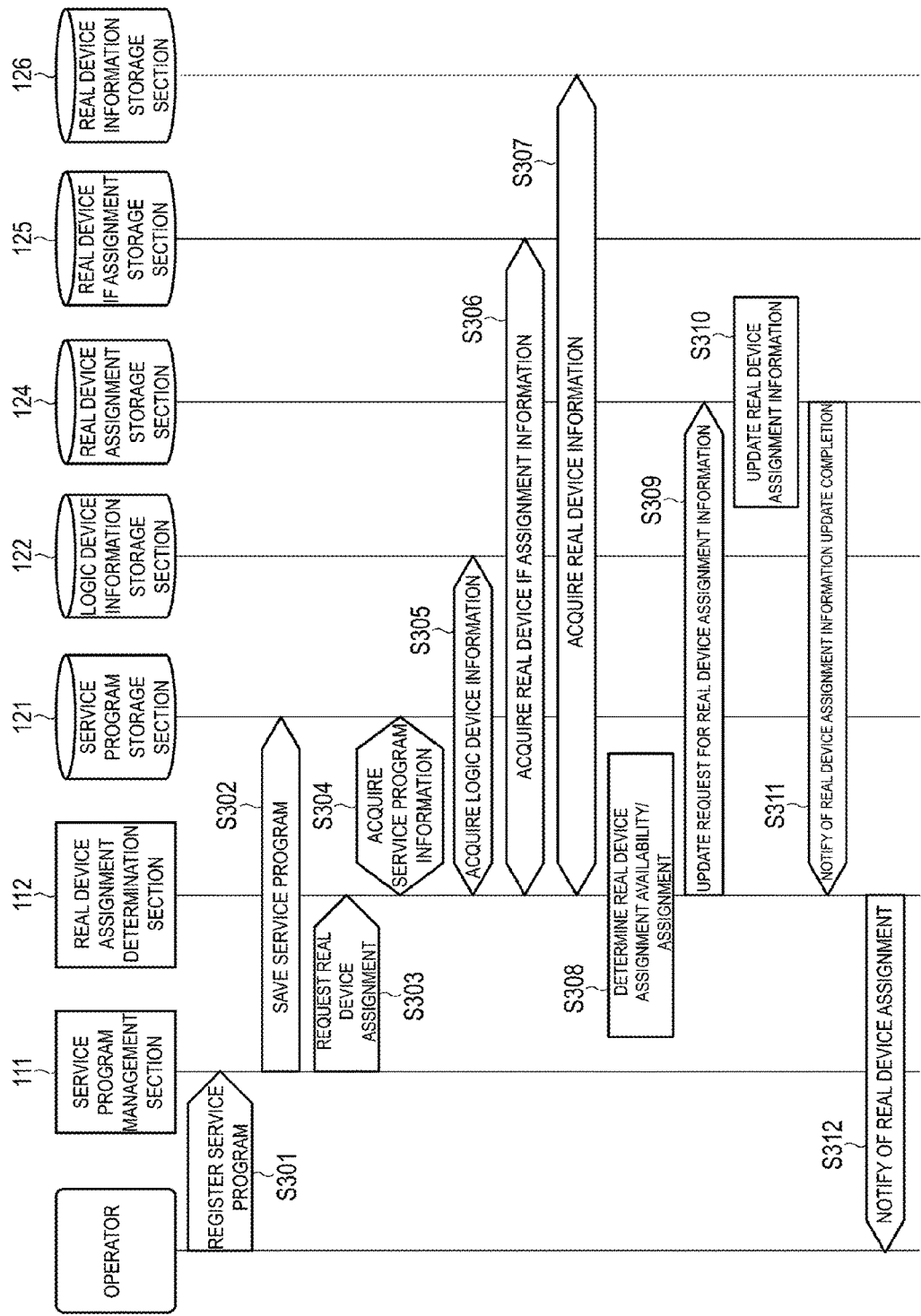
FIG. 10 is a sequence diagram illustrating an example of real device assignment determination processing executed by the control unit illustrated in FIG. 3.

FIG. 10 is a sequence diagram illustrating an example of real device assignment determination processing executed by the control unit 11 illustrated in FIG. 3. Note that the real device assignment determination processing is processing executed when the real device is dynamically assigned.

First, in step S301, an operator inputs a service program to the input section 2, and the control unit 11 acquires the service program from the input section 2 and registers the acquired service program under the control of the registration management section 1111 of the service program management section 111.

In step S302, the control unit 11 causes the service program storage section 121 to store the acquired service program under the control of the registration management section 1111.

In step S303, the control unit 11 transmits a real device assignment request relating to the service program to the real device assignment determination section 112 under the control of the registration management section 1111.

In step S304, the control unit 11 reads and acquires the service program stored in the service program storage section 121 under the control of the real device assignment determination section 112.

In step S305, the control unit 11 reads and acquires the logic device information stored in the logic device information storage section 122 under the control of the real device assignment determination section 112.

In step S306, the control unit 11 reads and acquires the real device interface assignment information stored in the real device interface assignment storage section 125 under the control of the real device assignment determination section 112.

In step S307, the control unit 11 reads and acquires the real device information stored in the real device information storage section 126 under the control of the real device assignment determination section 112.

Note that the processing of steps S304, S305, S306, and S307 may be performed in a different order than described above, or any of these may be performed in parallel.

In step S308, under the control of the real device assignment determination section 112, the control unit 11 determines whether real device assignment relating to the service program is possible based on the logic device information acquired in step S305, the real device interface assignment information acquired in step S306, and the real device information acquired in step S307, and determines the real device assignment when the real device assignment is possible. When the real device assignment is not possible, the control unit 11 notifies the operator of the fact that the real device assignment is not possible by using, for example, a display on a display section (not illustrated) under the control of the real device assignment determination section 112.

When the real device assignment is determined in step S308, the following processing is performed.

In step S309, the control unit 11 transmits a real device assignment information update request for writing the real device assignment determined in step S308 to the real device assignment storage section 124 under the control of the real device assignment determination section 112.

In step S310, the real device assignment information stored in the real device assignment storage section 124 is updated in response to the real device assignment information update request.

In step S311, the control unit 11 receives the real device assignment information update completion notification transmitted from the real device assignment storage section 124 under the control of the real device assignment determination section 112.

In step S312, the control unit 11 notifies the operator of the fact that the real device assignment relating to the service program is possible by using, for example, a display on a display section (not illustrated) under the control of the real device assignment determination section 112.

(3) Service Program Execution Sequence

Figure 11:
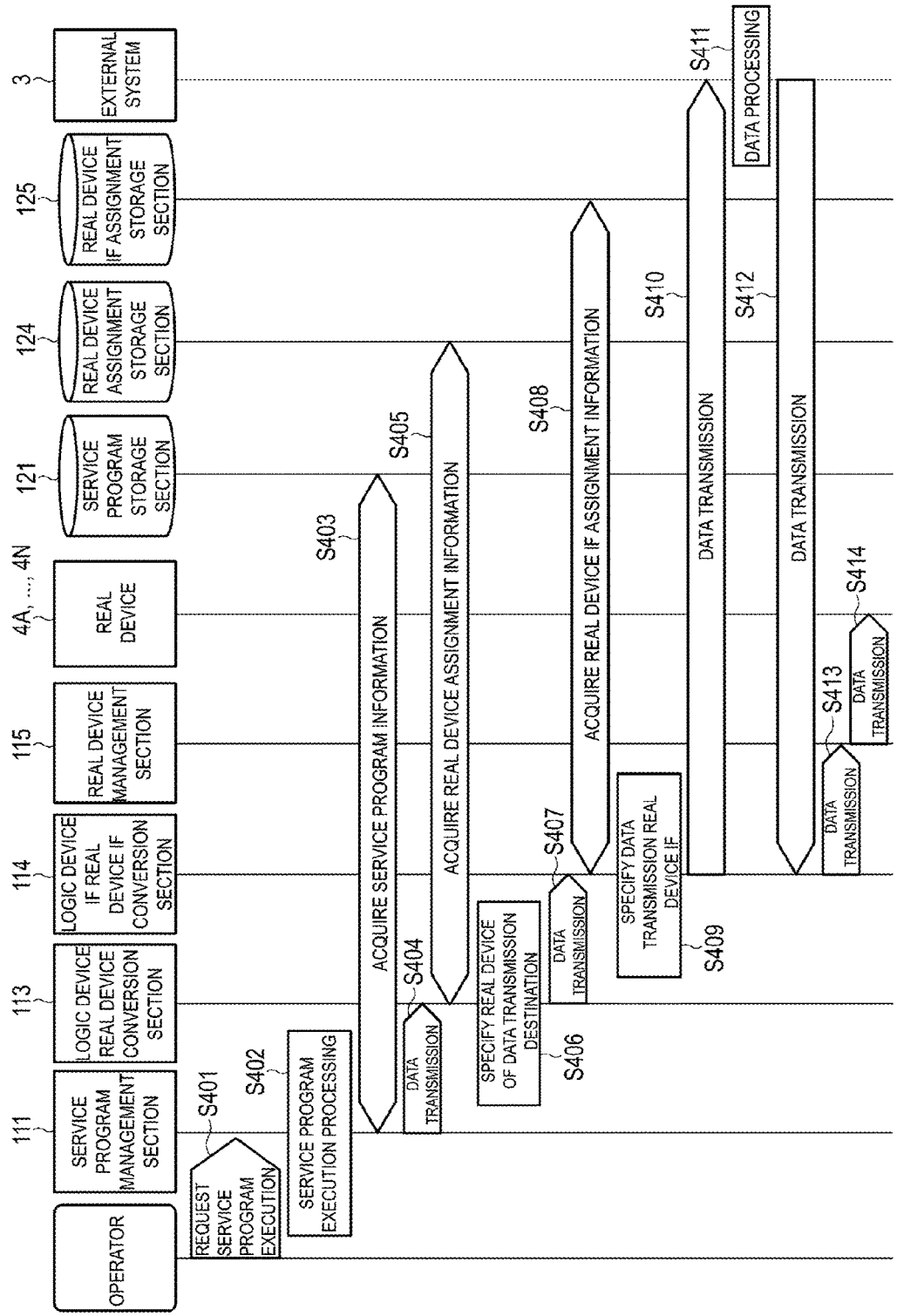
FIG. 11 is a sequence diagram illustrating an example of service program execution processing executed by the control unit illustrated in FIG. 3.

FIG. 11 is a sequence diagram illustrating an example of service program execution processing executed by the control unit 11 illustrated in FIG. 3.

First, in step S401, an operator inputs an execution request for a registered service program through the input section 2, and the control unit 11 acquires the execution request under the control of the execution management section 1112 of the service program management section 111.

In step S402, the control unit 11 performs execution processing of the service program relating to the execution request under the control of the execution management section 1112.

In step S403, the control unit 11 reads and acquires the service program relating to the execution request stored in the service program storage section 121 under the control of the execution management section 1112.

Here, the processing of steps S404 to S414 described next is processing executed at the time that data such as a device control command relating to the service program is transmitted to the real device when the service program is executed.

In step S404, the control unit 11 transmits data such as a control command relating to the service program being executed to the logic device real device conversion section 113 under the control of the execution management section 1112.

In step S405, the control unit 11 reads and acquires the real device assignment information stored in the real device assignment storage section 124 under the control of the logic device real device conversion section 113.

In step S406, the control unit 11 specifies the real device of the data transmission destination based on the real device assignment information read in step S405 under the control of the logic device real device conversion section 113.

In step S407, the control unit 11 transmits data to the logic device interface real device interface conversion section 114 under the control of the logic device real device conversion section 113.

In step S408, the control unit 11 reads and acquires the real device interface assignment information stored in the real device interface assignment storage section 125 under the control of the logic device interface real device interface conversion section 114.

In step S409, the control unit 11 specifies the real device interface of the data transmission destination under the control of the logic device interface real device interface conversion section 114.

In step S410, the control unit 11 transmits data to the external system 3 under the control of the logic device interface real device interface conversion section 114.

In step S411, the external system 3 converts data so as to enable data communication between the logic device interface and the real device interface.

In step S412, the external system 3 transmits data after the data conversion to the device coordination system 1, and the control unit 11 acquires the data after the data conversion under the control of the logic device interface real device interface conversion section 114.

In step S413, the control unit 11 transmits data after the data conversion by the external system 3 to the real device management section 115 under the control of the logic device interface real device interface conversion section 114.

In step S414, the control unit 11 transmits data to the destination real device among the real devices 4A to 4N under the control of the real device management section 115.

In the above description, the case where the data conversion in the external system 3 is used has been described. However, the present embodiment is not limited to this, and if the data conversion in the external system 3 is unnecessary, the processing of steps S410 to S412 may be omitted.

Figure 12:
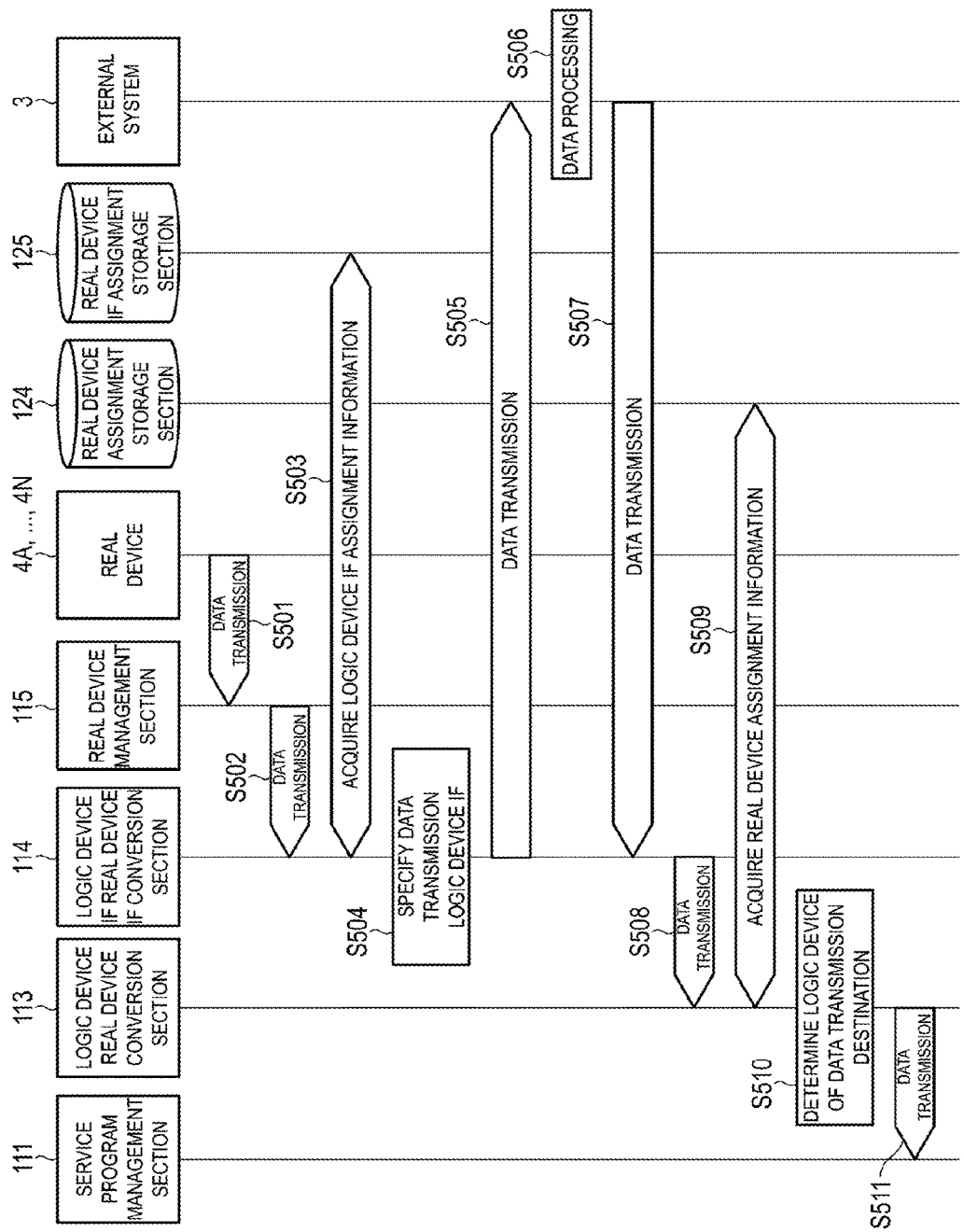
FIG. 12 is a sequence diagram illustrating an example of service program execution processing executed by the control unit illustrated in FIG. 3.

FIG. 12 is a sequence diagram illustrating an example of service program execution processing executed by the control unit 11 illustrated in FIG. 3.

The processing of steps S501 to S511 described next is processing executed at the time that the device transmission data such as measurement data relating to the service program is received from the real device when the service program is executed.

First, in step S501, any real device among the real devices 4A to 4N transmits device transmission data relating to the service program being executed to the device coordination system 1, and the control unit 11 acquires the transmitted data under the control of the real device management section 115.

In step S502, the control unit 11 transmits the acquired data to the logic device interface real device interface conversion section 114 under the control of the real device management section 115.

In step S503, the control unit 11 reads and acquires the real device interface assignment information stored in the real device interface assignment storage section 125 under the control of the logic device interface real device interface conversion section 114.

In step S504, the control unit 11 specifies the logic device interface of the data transmission destination under the control of the logic device interface real device interface conversion section 114.

In step S505, the control unit 11 transmits data to the external system 3 under the control of the logic device interface real device interface conversion section 114.

In step S506, the external system 3 converts data so as to enable data communication between the logic device interface and the real device interface.

In step S507, the external system 3 transmits data after the data conversion to the device coordination system 1, and the control unit 11 acquires data after the data conversion under the control of the logic device interface real device interface conversion section 114.

In step S508, the control unit 11 transmits the data after the data conversion by the external system 3 to the logic device real device conversion section 113 under the control of the logic device interface real device interface conversion section 114.

In step S509, the control unit 11 reads and acquires the real device assignment information stored in the real device assignment storage section 124 under the control of the logic device real device conversion section 113.

In step S510, the control unit 11 specifies the logic device of the data transmission destination based on the real device assignment information read in step S509 under the control of the logic device real device conversion section 113.

In step S511, the control unit 11 transmits data to the execution management section 1112 of the service program management section 111 under the control of the logic device real device conversion section 113.

In the above description, the case where the data conversion in the external system 3 is used has been described. However, the present embodiment is not limited to this, and if the data conversion in the external system 3 is unnecessary, the processing of steps S505 to S507 may be omitted.

Calculation Processing of Device Assignment Evaluation Value

Hereinafter, a device assignment evaluation value that can be used when the processing of determining whether the real device assignment is possible and the processing of determining the real device assignment in step S308 will be described in detail.

First, a logic device and a real device are defined as a set of logic device interfaces as follows.

$$r_n = \{x | f_n(x), x \in X\}$$

$$d_m = \{x | q_m(x), x \in X\}$$

$$n \in N, m \in M$$

The parameters are as follows, $r_n$: a set of logic device interfaces of logic device n, $d_m$: a set of logic device interfaces corresponding to real device interfaces of real device m, $f_n(x)$: logic device interface x belongs to logic device n, $q_m(x)$: logic device interface x belongs to real device m, X: an entire set of logic device interfaces stored in the logic device information storage section 122, N: an entire set of logic devices stored in the logic device information storage section 122, M: an entire set of connected real devices stored in the real device information storage section 126.

At this time, if a set of real devices (=a real device including at least one logic device interface of logic device n) that can constitute logic device n is set to $D_n$ and a power set of $D_n$ is set to $P(D_n)$, a set $DS_n$ of combinations of real devices that can constitute the logic device n is obtained as follows. Here, the expression that the real device constitutes or occupies the logic device is used as being synonymous with the assignment of the logic device to the real device, and the same applies to the following.

$$D_n = \{m \mid d_m \cap r_n \neq \emptyset, m \in M\} \quad \text{[Equation 1]}$$

$$DS_n = \left\{ p \mid \bigcup_{m \in p} d_m \supseteq r_n, p \in P(D_n) \right\} \quad \text{[Equation 2]}$$

In the following equations, a set of combinations of real devices for the i-th logic device n[i] used in the service program is defined as $DS_n[i]$, the j-th element included in $DS_n[i]$ is defined as p[i][j], the number of real devices constituting p[i][j] is defined as |p[i][j]|, and the number of logic device interfaces constituting $d_m$ is defined as $|d_m|$, respectively.

The logic devices used in the service program are defined as n[1], ..., n[N].

The evaluation values of the combination $f(p[i][j_1], \ldots, p[N][j_N])$ of the real devices to be assigned to each logic device is determined as follows using a first evaluation index $A_{11}$, a second evaluation index $A_{12}$, a third evaluation index $A_{21}$, and a fourth evaluation index $A_{22}$ are used to determine the following.

$$f(p[i][j_1], \ldots, p[N][j_N]) = a_{11}A_{11} + a_{12}A_{12} + a_{21}A_{21} + a_{22}A_{22}$$

where $a_{11}$, $a_{12}$, $a_{21}$, and $a_{22}$ are constants.

As described above, using the evaluation value based on at least one of the first evaluation index $A_{11}$, the second evaluation index $A_{12}$, the third evaluation index $A_{21}$, and the fourth evaluation index $A_{22}$, the processing of determining whether the real device assignment is possible and the processing of determining the real device assignment in step S308 can be executed.

In the processing of determining whether the real device assignment is possible in step S308, for example, when there is a real device assignment such that the evaluation value exceeds the first threshold value, it can be determined that the real device assignment is possible.

The real device assignment determined in the real device assignment determination processing in step S308 can be, for example, any real device assignment in which the evaluation value exceeds the second threshold value or real device assignment in which the evaluation value takes the maximum value.

1) First Evaluation Index

The first evaluation index $A_{11}$ and the second evaluation index $A_{12}$ are evaluation indices focusing on occupation by the self-real device or the self-logic device.

The first evaluation index $A_{11}$ is an index that takes into account the occupation of one logic device by one real device. This is based on the idea that it is originally assumed that one logical device is constituted by one real device, and a better assignment can be achieved when one logical device is constituted by fewer real devices.

The first evaluation index $A_{11}$ is expressed as follows.

$$A_{11} = b_{111} \frac{1}{|p[1][j_1]|} + \cdots + b_{11N} \frac{1}{|p[N][j_N]|} \quad \text{[Equation 3]}$$

Where $b_{111}, \ldots, b_{11N}$ is a constant equal to or greater than 0.

$A_{11}$ takes a maximum value when the number of real devices constituting one logic device is one, and approaches a minimum value as the number of real devices constituting one logic device increases.

FIG. 13 is a diagram illustrating a scheme relating to the first evaluation index $A_{11}$.

2) Second Evaluation Index

The second evaluation index $A_{11}$ is an index that takes into account the occupation of one real device by one logic device. This is based on the idea that it is originally assumed that one logic device is constituted by one real device, and a better assignment can be achieved when a logic device uses all the logic device interfaces of one real device.

The second evaluation index $A_{11}$ is expressed as follows.

$$A_{12} = b_{121} \frac{\left| \left\{ \bigcup_{m \in p[1][j_1]} d_m \right\} \cap r_1 \right|}{\left| \bigcup_{m \in p[1][j_1]} d_m \right|} + \quad \text{[Equation 4]}$$

$$\cdots + b_{12N} \frac{\left| \left\{ \bigcup_{m \in p[N][j_N]} d_m \right\} \cap r_N \right|}{\left| \bigcup_{m \in p[N][j_N]} d_m \right|}$$

Where $b_{121}, \ldots, b_{12N}$ is a constant equal to or greater than 0.

$A_{12}$ takes the maximum value when the logic device interfaces of one logic device match the logic device interfaces of the real device, and takes a value closer to the minimum value as there is a difference between the logic device interfaces of one logic device and the logic device interfaces of the real device.

Figure 14:
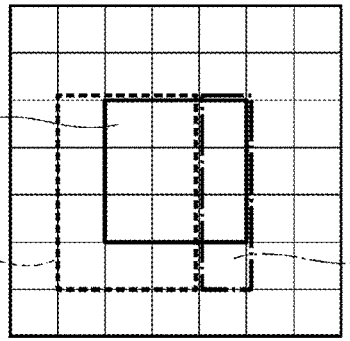
FIG. 14 is a diagram schematically illustrating a second evaluation index used for calculating a real device assignment evaluation value.

FIG. 14 is a diagram illustrating a scheme relating to the second evaluation index $A_{12}$.

3) Third Evaluation Index

The third evaluation index $A_{21}$ and the fourth evaluation index $A_{22}$ are evaluation indices focusing on the overlap with another real device or another logic device.

The third evaluation index $A_{21}$ is an index that takes into account a logic device interface of a logic device overlapping with another real device. This is based on an idea that, in addition to the first evaluation index $A_{11}$ when a real device constituting a logic device has a logic device interface overlapping another real device, the combination of real devices is not preferable because the logic device interface cannot be used effectively.

The third evaluation index $A_{21}$ is expressed as follows.

$$A_{21} = b_{211} \frac{\left|\bigcap_{m \in p[1][j_1]} d_m\right|}{\left|\bigcup_{m \in p[1][j_1]} d_m\right|} + \cdots + b_{21N} \frac{\left|\bigcap_{m \in p[N][j_N]} d_m\right|}{\left|\bigcup_{m \in p[N][j_N]} d_m\right|} \quad \text{[Equation 5]}$$

Where $b_{211}, \ldots, b_{21N}$ is a constant equal to or greater than 0.

$A_{21}$ takes the maximum value when there is no overlap in logic device interfaces constituting one logic device, and approaches the minimum value as the number of logic device interfaces constituting one logic device overlaps.

FIG. 15 is a diagram illustrating a scheme relating to the third evaluation index $A_{21}$.

4) Fourth Evaluation Index

The fourth evaluation index $A_{22}$ is an index that takes into account a logic device interface of a real device that overlaps with another logic device. This is based on the idea that, in addition to the second evaluation index, a better assignment can be achieved when the real device interface, which is assigned to a specific logic device, is less assigned to another logic device.

The fourth evaluation index $A_{22}$ is expressed as follows.

$$A_{22} = 1 - \sum_{i=1}^{N} \frac{\sum_{k=1}^{N} \left(b_{22ik} \left|\left\{\bigcup_{m \in p[k][j_k]} d_m\right\} \cap r_k\right|\right) - b_{22i}\left|\left\{\bigcup_{m \in p[i][j_i]} d_m\right\}\right|}{\left|\left\{\bigcup_{m \in p[i][j_i]} d_m\right\}\right|} \quad \text{[Equation 6]}$$

Where $b_{22ik}$, $b_{22i}$ is a constant equal to or greater than 0.

$A_{22}$ takes the maximum value when there is no overlap between the real device constituting one logic device and the real device constituting another logic device, and approaches the minimum value as the overlap between the real device constituting one logic device and the real device constituting another logic device increases.

FIG. 16 is a diagram illustrating a scheme relating to the fourth evaluation index $A_{22}$.

Effect (1) Under the control of the registration management section 1111 of the service program management section 111, a real device assignment request relating to the registered service program is transmitted to the real device assignment determination section 112. Under the control of the real device assignment determination section 112, logic device information is acquired from the logic device information storage section 122, real device interface assignment information is acquired from the real device interface assignment storage section 125, and the real device information about the available real device is acquired from the real device information storage section 126. After that, under the control of the real device assignment determination section 112, it is determined whether the logic device relating to the service program can be assigned to a real device based on the acquired logic device information, the acquired real device interface assignment information, and the acquired real device information. When the assignment is possible, the assignment of the logic device relating to the service program to the real device is determined. Finally, under the control of the real device assignment determination section 112, a real device assignment information update request for writing the determined assignment is transmitted to the real device assignment storage section 124 and the real device assignment information stored in the real device assignment storage section 124 is updated. Based on the real device assignment information, communication processing of the device control command and the device transmission data between the logic device relating to the service program and the real device determined to be an assignment destination of the logic device is performed, and the function of the logic device relating to the service program is executed.

In the processing of dynamically assigning a logic device to an available real device in this way, for example, it is also possible to assign the same kind of logical device to different kinds of real devices, or to assign a plurality of logic devices to one real device. Thereby, even when it is difficult to provide services in the related art, such as when the number and kinds of real devices required for providing services are insufficient in the service providing field, it is possible to provide services without adding the kind and number of real devices.

(2) The processing of determining whether the logic device relating to the service program can be assigned to a real device, and the processing of determining the logic device relating to the service program to be assigned to a real device under the control of the real device assignment determination section 112 are executed based on at least one of the first evaluation index, the second evaluation index, the third evaluation index, or the fourth evaluation index.

By using these evaluation indices, for example, the criteria for the assignment processing can be determined, such as the related functions of the logic device should be assigned to one real device as much as possible or the functions of one logical device is assigned to a plurality of real devices in an overlapping manner so that the real device interface can be used effectively.

(3) In the communication processing of the device control command and the device transmission data, the following processing is executed. Data is transmitted to the external system 3 under the control of the logic device interface real device interface conversion section 114. The external system 3 converts the data so that data communication between the logic device interface and the real device interface becomes possible. After that, data after the data conversion is transmitted to the device coordination system 1 by the external system 3, and the data after the data conversion is acquired under the control of the logic device interface real device interface conversion section 114.

By coordinating with such an external system 3, a combination of a logic device interface and a real device interface, which cannot normally correspond to each other, can also correspond, that is, the real device interface can be virtually expanded. Thereby, it is possible to assign a logic device to more kinds of real devices.

OTHER EMBODIMENTS

Note that the present disclosure is not limited to the first embodiment.

For example, the configuration of the device coordination system or the structure of data stored in the logic device information storage section, the real device assignment storage section, the real device interface assignment storage section, real device information storage section, and the like can be variously modified and implemented without departing from the gist of the present disclosure.

In short, the present disclosure is not limited to the above-described first embodiment as it is, and can be embodied by modifying its constituent elements in an implementation stage without departing from the scope of the disclosure. Various disclosures can be formed by appropriately combining a plurality of components disclosed in the first embodiment. For example, some components may be deleted from all the components illustrated in the first embodiment. Further, components of different embodiments may be appropriately combined.

REFERENCE SIGNS LIST

X Logic device assignment management function
Y Logic device interface assignment management function
1 Device coordination system
11 Control unit
111 Service program management section
1111 Registration management section
1112 Execution management section
112 Real device assignment determination section
113 Logic device real device conversion section
114 Logic device interface real device interface conversion section
115 Real device management section
1151 Real device registration section
12 Storage unit
121 Service program storage section
122 Logic device information storage section
123 Logic device storage section
124 Real device assignment storage section
125 Real device interface assignment storage section
126 Real device information storage section
13 Communication interface unit
2 Input section
3 External system
4A~4N Real device
NW Communication network

The invention claimed is:

1. A device allocation method executed by an apparatus including a hardware processor and a memory, the device allocation method comprising:
obtaining, for each real device among multiple different real devices, a first evaluation index determined based on a number of logical devices to which the real device is already assigned;
determining, from among the multiple different real devices, at least one real device to which a logical device is assigned for implementing a predetermined service based, at least in part, on a value of the first evaluation index; and
executing a function of the logical device through communication of a control command and data between the logical device and the determined at least one real device.

2. The device allocation method according to claim 1, wherein determining at least one real device further includes determining at least one real device to which the logical device is assigned based on information indicating how each logical device interface associated with the logical device corresponds to a real device interface associated with a real device.

3. The device allocation method according to claim 1, wherein executing the function of the logical device further includes communicating with a system configured to convert the control command or the data to enable data communication between the logical device interface associated with the logical device and the real device interface associated with the determined real device.

4. The device allocation method according to claim 1, further comprising:
detecting a real device,
wherein determining at least one real device further includes determining, out of the detected real device, at least one real device to which the logical device is assigned.

5. The device allocation method according to claim 2, wherein determining at least one real device to which the logical device is assigned is further based on at least one of:
the first evaluation index in which an evaluation value decreases, as a number of a real device to which one logical device is assigned increases from one;
a second evaluation index in which an evaluation value decreases, as a degree of matching decreases between a logical device interface associated with one logical device and a logical device interface corresponding to a real device interface of a real device to which the logical device is assigned;
a third evaluation index in which an evaluation value decreases, as more overlapping logical device interfaces are assigned among real devices to which one logical device is assigned; or
a fourth evaluation index in which an evaluation value decreases, as more overlapping logical device interfaces are assigned between a real device to which one logical device is assigned and a real device to which another logical device is assigned.

6. A device allocation system comprising:
an assignment determination section configured to perform operations including:
obtaining, for each real device among multiple different real devices, a first evaluation index determined based on a number of logical devices to which the real device is already assigned; and
determining, from among the multiple different real devices, at least one real device to which a logical device is assigned for implementing a predetermined service based, at least in part, on a value of the first evaluation index; and
a function execution section configured to execute a function of the logical device through communication of a control command and data between the logical device and the determined at least one real device.

7. A program, stored on a recording medium, for causing a computer to perform a device allocation method comprising:
obtaining, for each real device among multiple different real devices, a first evaluation index determined based on a number of logical devices to which the real device is already assigned;
determining, from among the multiple different real devices, at least one real device to which a logical device is assigned for implementing a predetermined service based, at least in part, on a value of the first evaluation index; and
executing a function of the logical device through communication of a control command and data between the logical device and the determined at least one real device.

8. The program according claim 7, wherein determining at least one real device further includes determining at least one real device to which the logical device is assigned based on information indicating how each logical device interface associated with the logical device corresponds to a real device interface associated with a real device.

9. The program according to claim 7, wherein executing the function of the logical device further includes communicating with a system that converts the control command or the data to enable data communication between the logical device interface associated with the logical device and the real device interface associated with the determined real device.

10. The program according to claim 7, wherein the device allocation method further comprises:

detecting a real device, wherein determining at least one real device further includes determining, out of the detected real device, at least one real device to which the logical device is assigned.

11. The program according to claim 8, wherein determining at least one real device to which the logical device is assigned is further based on at least one of:

the first evaluation index in which an evaluation value decreases, as a number of a real device to which one logical device is assigned increases from one;

a second evaluation index in which an evaluation value decreases, as a degree of matching decreases between a logical device interface associated with one logical device and a logical device interface corresponding to a real device interface of a real device to which the logical device is assigned;

a third evaluation index in which an evaluation value decreases, as more overlapping logical device interfaces are assigned among real devices to which one logical device is assigned; or a fourth evaluation index in which an evaluation value decreases, as more overlapping logical device interfaces are assigned between a real device to which one logical device is assigned and a real device to which another logical device is assigned.

\* \* \* \* \*